United States Patent

[11] 3,545,355

[72] Inventor Walter Lawrence Cahall, Jr.
Box 424, South Duxbury, Massachusetts 02332
[21] Appl. No. 756,508
[22] Filed Aug. 30, 1968
[45] Patented Dec. 8, 1970

[54] PHOTOMICROGRAPHY SYSTEM
8 Claims, 6 Drawing Figs.
[52] U.S. Cl. .................................................... 95/12
[51] Int. Cl. ..................................................... G03b 29/00
[50] Field of Search .......................................... 95/12;
287/52.07, 111, 118, 126, 135

[56] References Cited
UNITED STATES PATENTS
| | | | |
|---|---|---|---|
| 2,447,221 | 8/1948 | Warring | 285/193 |
| 2,736,581 | 2/1956 | Ricks | 287/118 |
| 2,765,718 | 10/1956 | Beecher | 95/12 |
| 2,943,876 | 7/1960 | Morris | 287/118 |
| 3,292,490 | 12/1966 | Moore | 95/12 |

Primary Examiner—Norton Ansher
Assistant Examiner—Michael Harris
Attorney—Willis M. Ertman ABSTRACT: Apparatus for facilitating photomicrography comprises a plurality of microscopes and a camera. A compensating structure is permanently secured to the tube of each microscope. Each compensating structure includes a seating surface and an outer cylindrical surface of predetermined dimension greater than the maximum dimension of the microscope eyepiece that is located above the seating surface. The camera has an adapter member attached to its lens mount. The adapter member has a barrel portion with an interior cylindrical surface that mates with the outer cylindrical surfaces of all of the compensating structures and a seating surface at the end remote from the lens mount coupling that seats on the seating surface of the compensating structure. A photomicrograph of a specimen on the stage of the microscope may be taken by the camera through the eyepiece lens, or the specimen on the stage may be viewed visually through the eyepiece lens merely by lifting the camera to slide the attached adapter member off the compensating structure.

PATENTED DEC 8 1970 3,545,355

PHOTOMICROGRAPHY SYSTEM

This invention relates to apparatus for photomicrography and more particularly to a system for facilitating the taking of photomicrographs, by inexperienced people, for example, in educational laboratories.

The microscope is a frequently used instrument in a variety of fields of investigation including zoology and botany as it substantially increases the dimensions of knowledge of the particular item of interest. As the microscope permits much fuller understanding of the subject under consideration, it is extensively used in learning environments. The camera is a useful pedagogical adjunct to the microscope as it further increases the range of materials that may be studied, and enables the student to preserve examples of his investigations, to make detailed study of specimens of interest by means of photomicrographs, and to have an additional tool available for laboratory work. Greater understanding and incentive can be provided through the use of photography in the educational process. However, microphotographic apparatus have not been extensively available in educational laboratories. Among the reasons for this lack are the difficulty of adapting cameras and microscopes to each other for student use; the unfamiliarity with the coordinated use of such equipment on the part of the students and teachers; and the cost of such equipment.

It is an object of this invention to provide a novel and improved photomicrography system which is particularly useful in educational laboratories.

Another object of the invention is to provide a photomicrographic system which permits the ready use of the plurality of microscopes for normal viewing and facilitates the simple and rapid attachment of a camera to a microscope for taking a photograph of an image that has been visually determined to be of interest.

Still other objects of the invention are to provide an inexpensive, reliable, convenient and easy to use camera-microscope accommodation system which facilitates photomicrography.

Another object of the invention is to provide a system which permits the taking of accurate photomicrographs without impairing the ready use of the microscope in normal manner.

In accordance with the invention there is provided apparatus for use with a camera and a plurality of microscopes in a system that facilitates and encourages photomicrography. The apparatus includes a plurality of compensating structures adapted for permanent attachment to the barrels of the corresponding plurality of microscopes. Each compensating structure includes a seating surface perpendicular to the optical axes of each microscope, and of an outer cylindrical surface of predetermined dimensions greater than the dimensions of the microscope oculars above the seating surface. An adapter member has a barrel portion with an inner cylindrical surface adapted to mate with the outer cylindrical surface of all the compensating structures, a seating surface at one end of the barrel portion adapted to seat on the clamp ring and a camera coupling at the other end of the barrel portion for fixed attachment to the lens mount of a camera. The adapter member is adapted to be secured to the camera so that the camera-adapter assembly, when the adapter is disposed over one of the compensating structures and seated on the seating surface, places the camera in alignment with the optical components of the microscope and the compensating structure is fixedly secured in a proper axial position relative to the microscope optics, so that the camera may be operated in normal manner to photograph a specimen on the stage, which specimen may be viewed visually through the microscope ocular merely by lifting the camera to slide the adapter member off the sleeve. Thus the students may use their microscopes in normal visual manner to view specimens of interest. When a student has a unique or particularly good specimen, he may take a photograph of it for preservation purposes, for further detailed study, or reinforcement of the learning experience or to inform the rest of the class, for example, merely by placing the camera-adapter assembly on the microscope and taking the picture. No disassembly of microscope components is necessary, no bulky attachment is used and the camera may be readily used for other purposes merely by detaching the adapter.

In a particular embodiment, the compensating structure includes a clamp ring and a compensating sleeve. The clamp ring in such an embodiment contains a threaded portion which receives a setscrew for fixedly securing the clamp ring on the barrel of the microscope. The compensating sleeve is a cylinder that fits over the microscope tube and is seated within the clamp ring which holds it firmly against the microscope tube; and the adapter includes frictional elements disposed in its inner surface to provide firm frictional support of the adapter and camera structure secured to it on the components of the compensating structure secured to the microscope barrel. The adapter in one embodiment includes a fitting that couples directly to the lens mount in place of the lens unit. It is preferred to use a single lens reflex camera with such an adapter so that the specimen may be viewed precisely in the photographed form. In another embodiment, for use with cameras of the Polaroid type, the adapter fits onto and accommodates the main lens of the camera. A provision for viewing and more accurate focusing with such nonreflex type cameras can also be provided in such an embodiment by including in the adapter a reflex viewing tube with a mirror or prism directing a portion of the light to a viewing tube.

Thus the system of the invention facilitates the taking of photomicrographs, particularly in such environments as educational laboratories where there are a number of microscopes available in a simple and easy to use manner. While the invention has particular advantage in educational laboratory environments, it also facilitates the ready use of both a camera and a microscope, alone or in combination, in other environments.

Other objects, features and advantages will be seen as the following description of particular embodiments of the invention progresses, in conjunction with the drawings, in which.

DESCRIPTION OF PARTICULAR EMBODIMENTS

Figure 1:
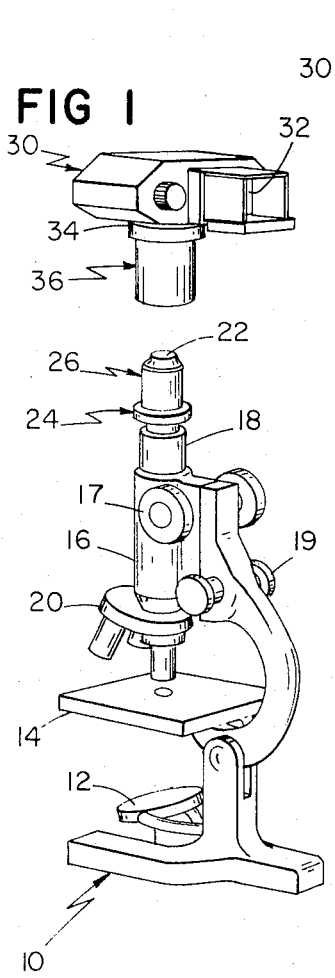
FIG. 1 is a perspective view of a microscope and camera to which are attached apparatus constructed in accordance with the invention.

With reference to FIG. 1, the microscope includes a stand 10 which supports a mirror holder 12, a stage 14 on which a specimen is disposed for viewing, and a tube carrier 16 that includes focusing adjustments 17 and 19. Disposed in the tube carrier is a tube 18 which, at its lower end, carries a three-lens turret 20 and, at its upper end, receives an ocular or eyepiece 22. Fitted on the smaller diameter upper end of tube 18 is a compensating structure that includes a clamp ring 24 and a sleeve 26. Cooperating with this microscope is a camera 30 of the single lens reflex type that has a reflex finder structure 32. Attached to the lens mount 34 of camera 30 is adapter structure 36.

Figure 2:
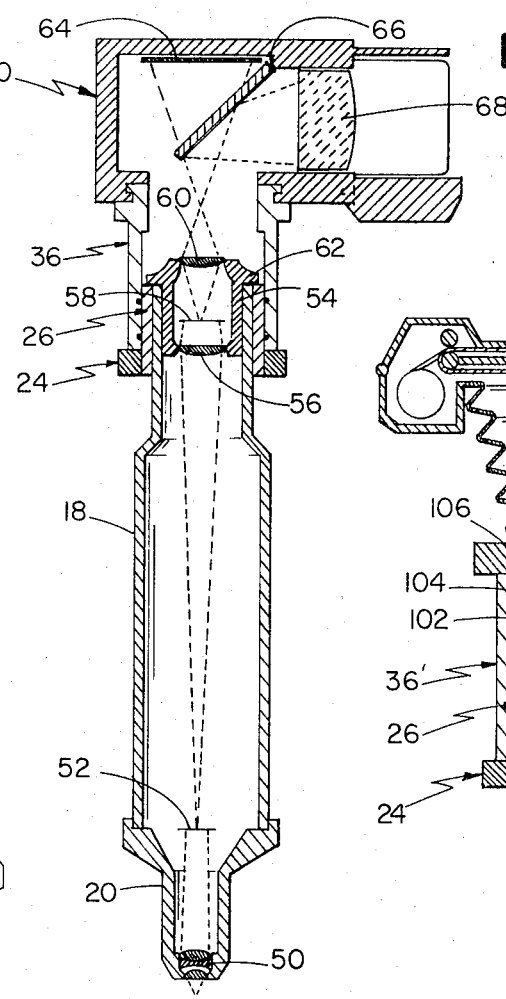
FIG. 2 is a diagrammatic optical view of the optical systems of a microscope and camera as produced with the apparatus of the invention.

The relationships of the optical systems of the microscope and camera with the adapter 36 seated on clamp ring 24 are shown in FIG. 2. The microscope includes an objective lens 50 carried by the turret 20 which forms a first image 52; and a removable eyepiece 54 which includes a first lens 56 which produces a second image 58 and a second lens 60 at the upper end of the eyepiece. This eyepiece structure has an annular ridge 62 which projects radially beyond the outer wall of the upper end of barrel 18 so that the eyepiece 54 may be seated therein. The camera 30 has a film plane 64 and a mirror 66 which may be swung into position for reflecting light onto ground glass screen 68 for reflex viewing.

Figure 3:
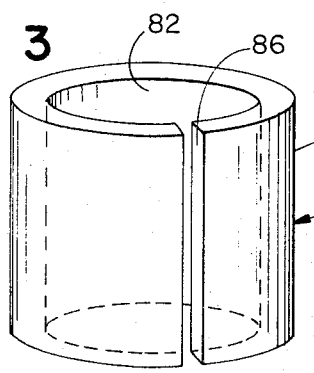
FIG. 3 is a perspective view of a sleeve component of the apparatus.
Figure 4:
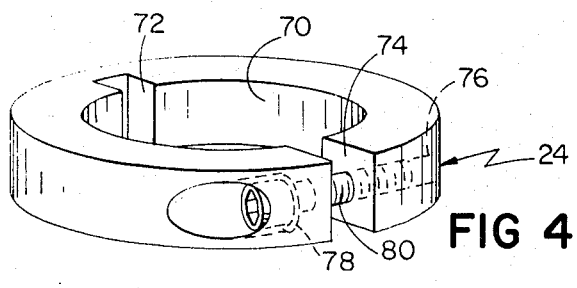
FIG. 4 is a perspective view of the clamp ring apparatus shown in FIG. 1.
Figure 5:
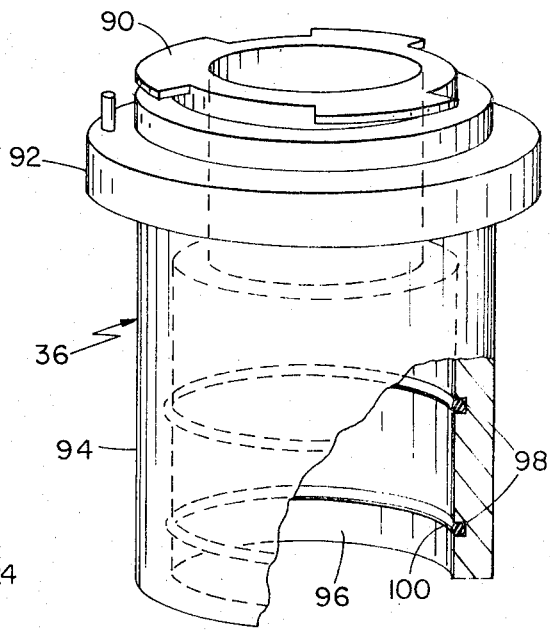
FIG. 5 is a perspective view of the adapter component of the apparatus shown in FIG. 1.

With reference to FIGS. 3—5, the aluminum clamp ring or locking collar 24 is one-fourth inch thick and has an outer diameter of 1⅝ and an inner surface 70 of a diameter corresponding to the outer diameter of sleeve 26 as positioned on the upper end of the ⅛ barrel to which it is clamped, the diameter of surface 70 for one type of microscope being 1⅛ inches and for another microscope being 1¼ inches. A slot 72 is provided in surface 70 to facilitate flexing under clamping pressure. A gap 74 through the ring is provided opposite slot 72. A threaded hole 76 extends perpendicular to gap 74 on one side thereof and a bolt seat 78 is formed in the opposite side of the gap to receive a clamping bolt 80. Collar 24 and sleeve 26 are secured to barrel 18 with collar 24 being located at a suitable axial position as a function of the optical characteristics of the microscope and the camera to be used with the microscope. Sleeve 26, as shown in FIG. 4, is a cylinder that has an inner wall 82, an outer wall 84, and an axially extending slot 86 so that, with ocular 54 removed, it slides easily over the upper end of the tube 18 to provide, by its outer surface, a known diameter which is greater than that of the lip 62 of the ocular. In this embodiment the sleeve is 1 inch long and has an outer diameter of 1⅛ inches. The diameter of the inner surface is substantially the same as the outer diameter of the barrel of the microscope to which it is to be attached. In actual practice the great majority of monocular microscope most commonly used in schools and colleges are of two general types, having a barrel diameter in the range of .987 inch to 1.002 inches or in the range of 1.055 inches to 1.070 inches. Two sleeve sizes thus will accommodate most microscopes. To make the system fit most firmly on those barrels in the lower ends of these ranges specific size sleeves can be provided, but a more practical method is the use of shims of 0.003 to 0.005 inch thickness between the sleeve and microscope barrel. One or two such shims will make the system fit without "play". A sheet of fiberglass shim stock 0.004 inch thick, from which shims about one-half inch square may be cut, has been found ideal for this purpose and a sheet of such shim stock is conventionally provided with a set of an adapter and ten compensating structures.

Adapter 36 shown in FIG. 5 is designed for use with a camera having an Exakta lens mount and includes a lens mount structure 90 at its upper end, a three-eights inch wide manipulating surface 92; a barrel section 94 of 1⅝ inches outer diameter and 2 inches long; and a cylindrical inner surface 96, 1¾ inches long and of a diameter proportioned to the outer surface dimension 84 of sleeve 26. In this embodiment that inner surface dimension is 1⅛ inches while in another embodiment the inner surface dimension is 1¼ inches. Grooves 98 formed in inner surface 96 receive O-rings 100 to provide a frictional fit.

Adapter 36 is attached to the lens mount of the camera 30 as indicated in FIGS. 1 and 2. A compensating set of a clamp ring 24 and sleeve 26 is attached to each of the several microscopes to be used in the system should the ocular 54 be removed while installing these parts (a step frequently not necessary due to the resilience of sleeve 26), it is returned to position and the microscope is then focused with a specimen on stage 14. The camera with the adapter 36 attached to it is positioned above the microscope and the adapter barrel slid down the sleeve 26 to be seated on ring 24. The image formed is then viewed through the reflex system 32 of the camera on the ground glass screen 68 and the axial position of the clamp ring 24 adjusted. The axial position of the clamp ring 24 may be adjusted slightly up or down to provide a different projection length of the image, thereby altering the amount of the specimen field seen on the ground glass. In most cases a full frame image can be obtained with this system when desired.

Critical focusing is now obtained by turning the microscope fine focus wheel 19 while observing the image on the ground glass 68. A camera such as the Exakta has a magnifier lens which "flips up" at the outer edge of the reflex finder structure 32 for a magnified view of the ground glass. A clear spot in the center of the ground glass can also be provided, which gives a bright view of the image formed by the ocular. Thus in this embodiment, the microscope optics are substituted for the camera lens.

In a typical use in a high school or college laboratory, all of the microscopes are fitted with the compensating structures of a clamp ring 24 and a sleeve 26; a camera is fitted with an adapter 36; and the position of the clamp rings adjusted as described above. Each microscope may then be used visually in normal manner. The clamp ring and sleeve components are compact and do not interfere with this use. If a photograph is desired to be taken of a specimen on the stage 14, all that need be done is slide a camera-adapter assembly over the sleeve 26 into seated position on ring 24 and a photograph may be taken immediately.

Figure 6:
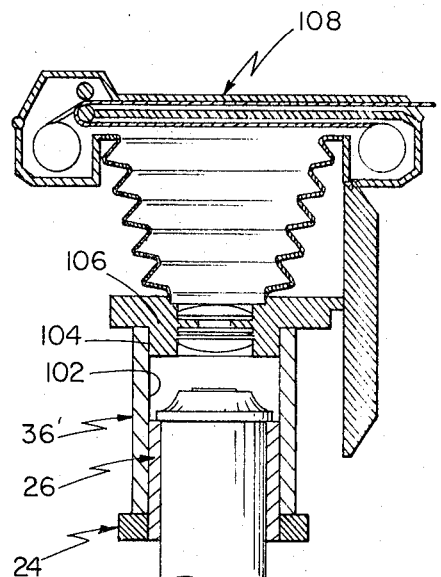
FIG. 6 is a diagrammatic view of a modified form of apparatus constructed in accordance with the invention

In a second embodiment shown in FIG. 6, a modified adapter 36' is employed. Fabric material 102 on sleeve 26' provides a resilient frictional surface. The upper end of adapter 36' has a surface 104 which is arranged to be press fitted in the circular lens housing of a Polaroid camera 108. The adapter is seated firmly on the lens housing 106. The compensating structure of ring 24' and sleeve 26' is secured to the microscope barrel in a predetermined axial position. In use, initially the microscope is visually focused by manipulating adjustment mechanism 17. With the camera 108 focused at infinity, the camera-adapter assembly is seated on the compensating structure and a photograph of the specimen may be taken.

A provision for viewing and more accurate focusing with such nonreflex type cameras can also be provided in such an embodiment by including in the adapter a reflex viewing tube and a mirror prism which directs a portion of the light to the viewing tube. Thus in a typical kit of ten compensating structures and an adapter provided in accordance with the invention plus optional shim stock permits ten microscopes to be readily available for photomicrography with a single camera. By using the same eyepiece for viewing and photography, the specimen will be viewed and photographed in a similar relationship, a desirable situation for school use. Should a specialize eyepiece providing a wide field, or flat field, for example, be desired, it can of course be substituted for the microscope's standard eyepiece, prior to taking the photograph. Also the invention may be used with other than monocular microscopes, such as binocular or stereo devices for example.

Thus, while particular embodiments of the invention have been shown and described, modifications thereof will be apparent to those skilled in the art and therefore it is not intended that the invention be limited to the disclosed embodiments or to details thereof and departures may be made therefrom within the spirit and scope of the invention as defined in the claims.

I claim:

1. Apparatus for use with a camera and a plurality of microscopes for facilitating photomicrography comprising:

a plurality of compensating structures permanently secured to the tubes of a corresponding plurality of microscopes, each microscope tube having an eyepiece lens at one end thereof and each compensating structure providing a seating surface perpendicular to the optical axis of its microscope tube and an outer surface of predetermined dimension greater than the maximum dimension of the microscope eyepiece;

and an adapter member having a barrel portion with an interior surface adapted to mate with the outer surfaces of all of said compensating structures; said barrel portion having a seating surface adapted to seat on the seating surface of said compensating structure, and a lens mount coupling at the other end of said barrel portion; and said adapter member being secured to the lens mount of said camera by means of said lens mount coupling so that said camera, when said adapter member is disposed over one of said compensating structures and seated on said seating surface, is maintained in alignment with the optical components of the microscope by the mating engagement of the outer surface of said compensating structure and the inner surface of said adapter member so that a specimen on the stage of the microscope may be photographed and the specimen on said stage may be viewed visually through the eyepiece of the microscope merely by lifting the camera to slide the attached adapter member off the compensating structure.

2. The apparatus as claimed in claim 1 wherein said compensating structure includes means allowing said compensating structure to resiliently conform to the outer surface of the microscopic tube.

3. The apparatus as claimed in claim 2 and further including a threaded adjustment member for securing said compensating structure in fixed position on the tube of the microscope.

4. The apparatus as claimed in claim 1 and further including frictional resilient elements disposed on the inner surface of said barrel of said adapter member for cooperating engagement with said outer cylindrical surface of said compensating structure.

5. The apparatus as claimed in claim 1 wherein each said compensating structure includes a clamp ring which provides said seating surface and a compensating sleeve member which provides an axially extending cylindrical surface, said sleeve adapted to be disposed under said clamp ring and held firmly against the microscope tube by said clamp ring.

6. The apparatus as claimed in claim 5 wherein said clamp ring includes a threaded adjustment member for securing said clamp ring and said sleeve in fixed position on the tube of the microscope.

7. Apparatus for facilitating photomicrography comprising:
   a microscope having a stand, a stage for receiving a specimen to be viewed, a barrel having an optical element supported therein and an eyepiece lens removably mounted at the upper end of said barrel, said optical element and said eyepiece lens defining an optical axis, and said barrel and said stage being supported on said stand;
   a compensating structure secured to the upper portion of said barrel adjacent said eyepiece to provide a seating surface extending outwardly from said barrel generally perpendicularly to said optical axis and an outer surface of predetermined dimension greater than the maximum dimension of the microscope eyepiece;
   an adapter member having a barrel portion with an interior surface adapted to mate with the outer surfaces of said compensating structure; said barrel portion having a seating surface seated on the seating surface of said compensating structure and a lens mount coupling at the other end of said barrel portion; and
   a camera, said camera having a lens mount secured by means of said lens mount coupling to said adapter member so that said camera is maintained in alignment with the optical components of the microscope by the mating engagement of the outer surface of said compensating structure and the inner surface of said adapter member so that a photomicrograph of a specimen on the stage of the microscope may be taken by said camera through said eyepiece lens and the specimen on said stage may be viewed visually through said eyepiece lens of said microscope merely by lifting said camera to slide said attached adapter member off said compensating structure and without any further focusing adjustment of said microscope barrel.

8. A camera-microscope accommodation system for facilitating photomicrography comprising:
   a plurality of compensating structures permanently secured to the tubes of a corresponding plurality of microscopes, each microscope tube having an eyepiece lens at one end thereof and each said compensating structure including a clamp ring secured to its microscope tube at a point spaced from said eyepiece lens and providing a seating surface perpendicular to the optical axis of its microscope tube and a compensating sleeve having an outer cylindrical surface of predetermined dimension greater than the maximum dimension of the microscope eyepiece above said seating surface;
   each said compensating sleeve having an axially extending slot allowing said compensating sleeve to resiliently conform to the outer surfaces of the microscope tubes, a shim element inserted between the inner surface of at least one of said compensating sleeves and the outer surface of its microscope tube to provide a firm cylindrical surface;
   an adapter member having a barrel portion with an interior cylindrical surface mating in sliding relation with the firm outer cylindrical surfaces of said compensating sleeves, a seating surface at one end of said barrel portion adapted to seat on the seating surface of said clamp ring, and a lens mount coupling at the other end of said barrel portion; and
   a camera having a lens mount, said adapter member being secured to the lens mount of said camera by means of said lens mount coupling so that when the inner surface of said adapter member is disposed over and in mating relation with the outer surface of one of said compensating sleeves and seated on said seating surface of the associated clamp ring, is maintained in alignment with the optical components of the microscope so that a photograph of a specimen on the stage of the microscope may be taken by said camera through said eyepiece lens and the specimen on said stage may be viewed visually through said eyepiece lens of said microscope merely by lifting said camera to slide said attached adapter member off said compensating structure and without any further focusing adjustment of said microscope barrel.